(12) United States Patent
Lefebvre et al.

(10) Patent No.: US 6,171,138 B1
(45) Date of Patent: Jan. 9, 2001

(54) ELECTRICAL CONNECTOR FOR REMOVABLE COMPONENTS

(75) Inventors: James Donald Lefebvre, Cary; Steve Mina, Lake Villa; William B. Weaver, Grayslake, all of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/493,581

(22) Filed: Jan. 28, 2000

(51) Int. Cl.[7] ..................................................... H01R 3/00
(52) U.S. Cl. .............................. 439/500; 429/97; 439/660
(58) Field of Search .................................. 439/500, 660, 439/627; 429/97, 98, 96, 100, 123

(56) References Cited

U.S. PATENT DOCUMENTS

| 5,607,791 | * | 3/1997 | Garcia et al. | 429/96 |
| 5,697,070 | * | 12/1997 | Liebler | 439/500 |
| 5,895,729 | * | 4/1999 | Phelps, III et al. | 429/97 |

\* cited by examiner

Primary Examiner—Brian Sircus
Assistant Examiner—Thanh-Tam Le
(74) Attorney, Agent, or Firm—Lalita P. Williams

(57) ABSTRACT

An electrical connector assembly combines a latch (34) and electrical contacts (60a–60f) into an integral connector assembly. The latch (34) is partially surrounded by a stacked connector (36). The latch (34) lathes with a housing (22) and the stacked connector (36) includes a connector contact housing (40) that includes a plurality of stacked contacts (60a–60f) to provide an electrical connection between a first (60) and second (64) electrical circuit. In one embodiment, the connector contact housing (40) is in a "U" shape and partially surrounds at least a portion of the latch (34). The stacked connector (36) engages with a receptacle well (38) having a plurality of corresponding stacked receptacle contacts (62a–62f). The plurality of stacked contacts (60a–60f) is positioned in a manner to provide balanced contact loading along at least one axis (100) of the stacked connector (36). As such, in one embodiment, the stacked contacts (60a–60f) are arranged in an opposing manner.

44 Claims, 8 Drawing Sheets

ELECTRICAL CONNECTOR FOR REMOVABLE COMPONENTS

FIELD OF THE INVENTION

The invention relates generally to electrical connectors and more particularly to electrical connectors employed in electronic appliances and in removable battery covers.

BACKGROUND OF THE INVENTION

Portable devices that employ batteries, such as handheld cell phones, Internet appliances, personal organizers, point of sale (POS) terminals, portable computing devices and any other portable devices are increasingly using small removable accessories which are typically as small as a parent device to which they connect. For example, cell phones are proposed that employ card reader devices to allow a user to insert a credit card, smart card, or other information input devices into the cell phone to create smart card enabled telephone appliances, Internet appliances, portable ATM devices, and a litany of other compact portable products. Such small handheld devices typically require compact connectors to electrically and mechanically interconnect differing subsystems or components.

Accordingly, removable accessories typically must be connected to a mother board or other electrical circuitry in another part of the parent device. A problem arises when such accessories are to be integrated in small handheld devices. Batteries, which are typically used to provide power to, for example, cell phone circuitry or circuitry of a POS terminal, can be expensive items and can also take up large amounts of volume of a parent device or accessory device.

Batteries usually are one of the largest components of the hand held device. In addition, it is desirable to maximize battery storage areas since typically larger batteries can provide longer battery life for the parent device and/or accessory device. Conventional cell phones, for example, have battery covers that do not house a battery, but which merely cover the primary battery that is located in the body of the parent device. One example is a Motorola Inc. model number P7389 GSM Tri-band cell phone distributed from Motorola Inc., Harvard, IL, USA. A push button latch allows a user to attach or remove the battery cover to replace the primary battery in the parent device when needed. However, such battery covers do not typically include accessory devices, nor do they include electrical connection between the battery cover and a circuit in the parent housing.

With respect to a card reading accessory, one solution has been to redesign the battery compartment for the parent device and redesign the battery itself to accommodate the addition of an accessory component. For example, one design combines the accessory, such as a card reader, with an integrated battery in an integral accessory module, so that a user needs to purchase the entire accessory module when the accessory battery needs to be replaced. The accessory battery usually replaces the primary battery used by the parent device. In order to provide connection of electrical circuits including signaling busses, power and ground lines and other signaling lines between the accessory and parent circuitry, flexible circuits are typically added and designed to wrap around the accessory battery and electrically connect a circuit board in the accessory device with a circuit board in the parent device through a contact interface. These flexible circuits and connector interfaces add cost, take up additional volume and can reduce reliability. They also can increase the size of the accessory device and/or the parent device.

Alternatively, accessory devices are sometimes attached to existing cell phones and other electronic appliances through a base plug typically located, for example, at the base of a parent device housing. Base plugs are typically used to allow an external power connection to recharge the battery. For example, car lighters and conventional outlets can be used to recharge a battery through the base plug. In addition, other accessories such as microphones, speakers and other accessories may also be coupled to the base plug. Typical larger accessories, however, slide over the battery cover and obtain their power from the base plug. Such accessories typically overhang the profile of the parent housing thus making the parent device unnecessarily longer. Attaching in this fashion may cover the base plug. An additional base plug may have to be added in the accessory device to provide access to the primary device. This can increase cost. A further problem arises. Card readers and other devices that communicate highly proprietary information need to comply with tamper evidence standards.

For example, portable devices and nonportable devices typically need to be designed in such a way that if the device is tampered with, such tampering can be recognized readily. With credit card reading devices attached to cell phones or other appliances, financial transactions may require the device to send confidential credit card information and bank account information. Such devices should not typically allow access through external plugs so that a potential hacker can obtain the confidential information. Accordingly, base plugs should not typically provide outside access if they are coupled to a card reading device or other suitable device. Accordingly, duplicate base plugs must typically be provided which are isolated from the accessory while still allowing the parent device to accept power to the base plug or other information for other accessories. This can significantly increase costs and device complexity.

Other solutions have been to provide smart batteries having card reader capabilities. For example, some cell phones have subscriber identity modules (SIMs) which can be slipped into a battery slot. The battery contains an electrical circuit that can read the SIM and provide information to the accessory device. In addition, card reading circuitry is also integrated into the battery. However, such devices typically employ an additional battery within the accessory device and are typically integrated into an integral module that requires a user to purchase a new accessory device when the battery of the accessory device needs to be replaced. In addition, another battery is typically required for normal operation of the phone when the accessory is removed. This can unnecessarily increase the cost and complexity of the system. In addition, such systems typically employ connectors that use the same electrical contacts for the accessory as were used for the parent circuits. For example, a SIM may be removed as part of the phone and placed as a plug-in SIM as part of the accessory. The existing SIM contacts in the parent device are used to connect with a multiplexing circuit within the accessory (e.g., smart battery) to allow both the SIM and an accessory to be multiplexed to the parent devices SIM contact block. However, such devices can be quite costly and complex.

Other cell phones are known which allow battery modules, with integral batteries, to be interconnected with a parent housing and/or accessories through two rows of stacked contacts. The two rows of stacked contacts are typically offset in height so that, depending upon the type of accessory, different contacts are utilized. Such stacked contacts are typically arranged such that the resiliency of the contacts from the phone body with the battery module typically act to force the battery module away from the phone body. This can result in increased gaps between the battery and the device. For example, such phones with two rows of stacked contacts typically have their two rows of contacts located on a back surface and the battery module is slid into place so that compliant contacts of the battery module contact with non-compliant stacked contacts coming out of the phone body. Moreover, the battery modules do not include removable battery covers and require a user to purchase an entire battery module if the battery needs to be replaced.

Consequently, a need exists for an improved electrical connector, removable battery cover and electronic appliance which attempts to overcome the above problems.

DETAILED DESCRIPTION OF THE PREFERRED EMBODIMENT

An electrical connector assembly combines a latch and electrical contacts into an integral connector assembly. The latch is partially surrounded by a stacked connector. The latch latches with a housing and the stacked connector includes a connector contact housing that includes a plurality of stacked contacts to provide an electrical connection between a first and second electrical circuit. In one embodiment, the connector contact housing is in a "U" shape and partially surrounds at least a portion of the latch, such as a latch well. The stacked contacts of the stacked connector engage with a plurality of corresponding stacked receptacle contacts in a receptacle well. The plurality of stacked contacts is positioned in a manner to provide balanced contact loading along at least one axis of the stacked connector. As such, in one embodiment, the stacked contacts are arranged in an opposing manner.

In another embodiment, a removable battery cover employs the latch and stacked connector. The removable battery cover includes an electrical circuit that is housed inside the removable battery cover on, for example, a printed circuit board. The removable battery cover may include a printed circuit board support plate wherein the electrical circuit is electrically connected through the stacked connector to another printed circuit board located in a separate housing such as a parent device housing. The separate housing includes a battery storage area. The removable battery cover covers the battery located in the battery storage area. Where the removable battery cover includes an electrical circuit(s) to provide, for example, a card reader or other accessory, the removable battery cover can be less expensive since it does not house the battery. If an accessory is not desired, a conventional battery covers with no electrical circuitry may be used to provide compatibility between, for example, a parent electronic appliance having an accessory and an electronic appliance that does not require an accessory.

In another embodiment, an electronic appliance includes a housing with a battery storage area, the connector receptor well and an electrical circuit that receives energy from a battery stored in the battery storage area. The electronic appliance also includes the removable battery cover that includes the latch and stacked connector. Accordingly, an electronic appliance electrically and mechanically connects with the removable battery cover that houses the accessory.

Figure 1:
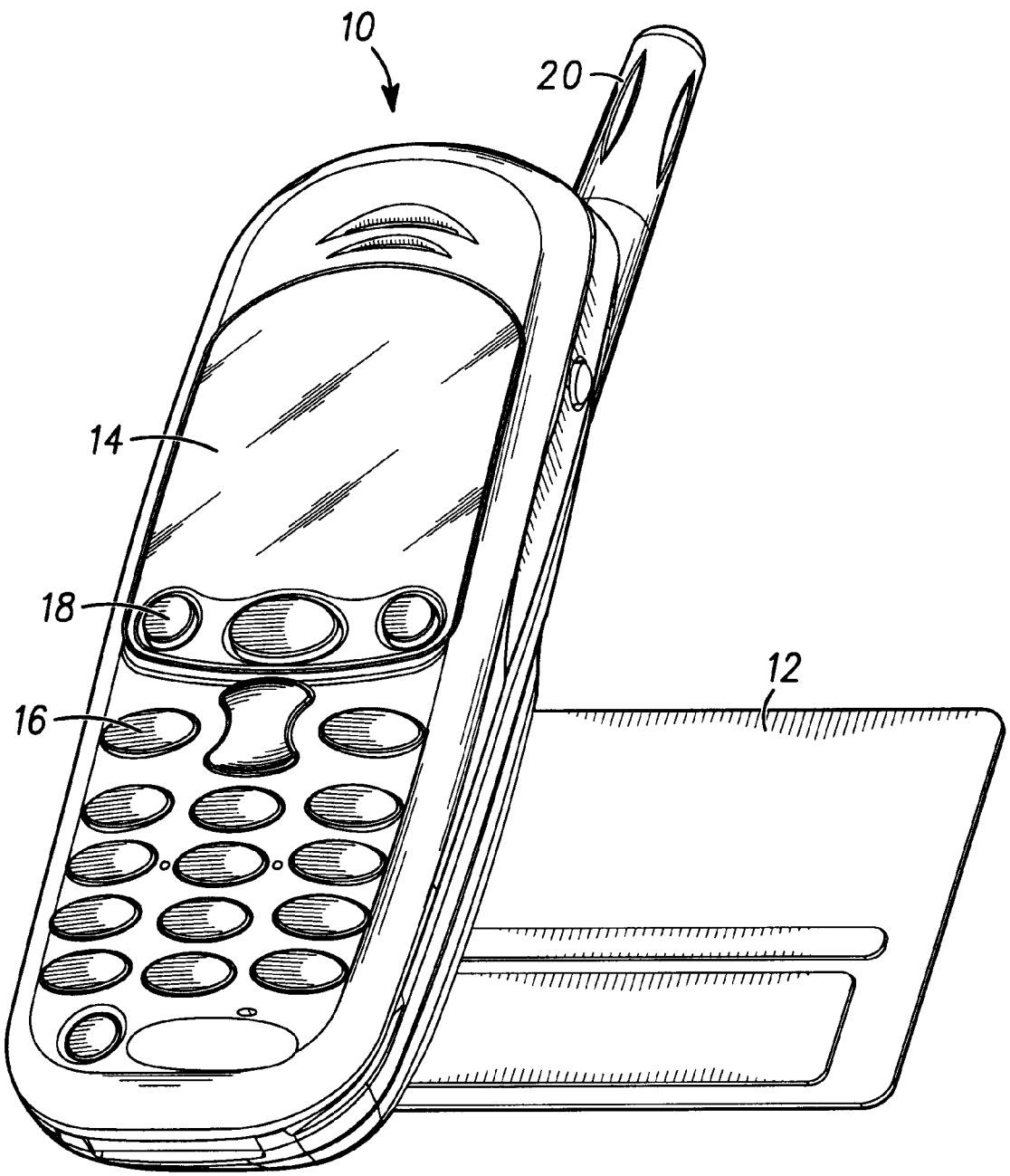
FIG. 1 is a front perspective view of an electronic appliance in the form of a cell phone which receives a card in accordance with one embodiment of the invention.

FIG. 1 illustrates one example of an electronic appliance 10, such as a cellular phone, which includes an accessory device, such as a card reader to read, for example, a magnetic card or smart card 12, or any other accessory device. For purposes of illustration, and not limitation, the disclosed invention will be described with reference to an electronic appliance in the form of a handheld telephone appliance. However, it will be recognized that the invention is equally applicable to other electronic appliances. For example, Internet appliances, personal organizers, portable computing units, touch pad or touch screen-based devices, digital audio players, and any other suitable device may also suitably use the electrical connector as described herein. The electronic appliance includes, by way of example, a display screen 14, telephone key inputs 16, a plurality of control keys 18, and an antenna 20 for providing wireless communication. The card 12 may be a storage medium, a smart card containing microprocessor or other circuits, or any other suitable card, information processor or information provider or receiver.

Figure 2:
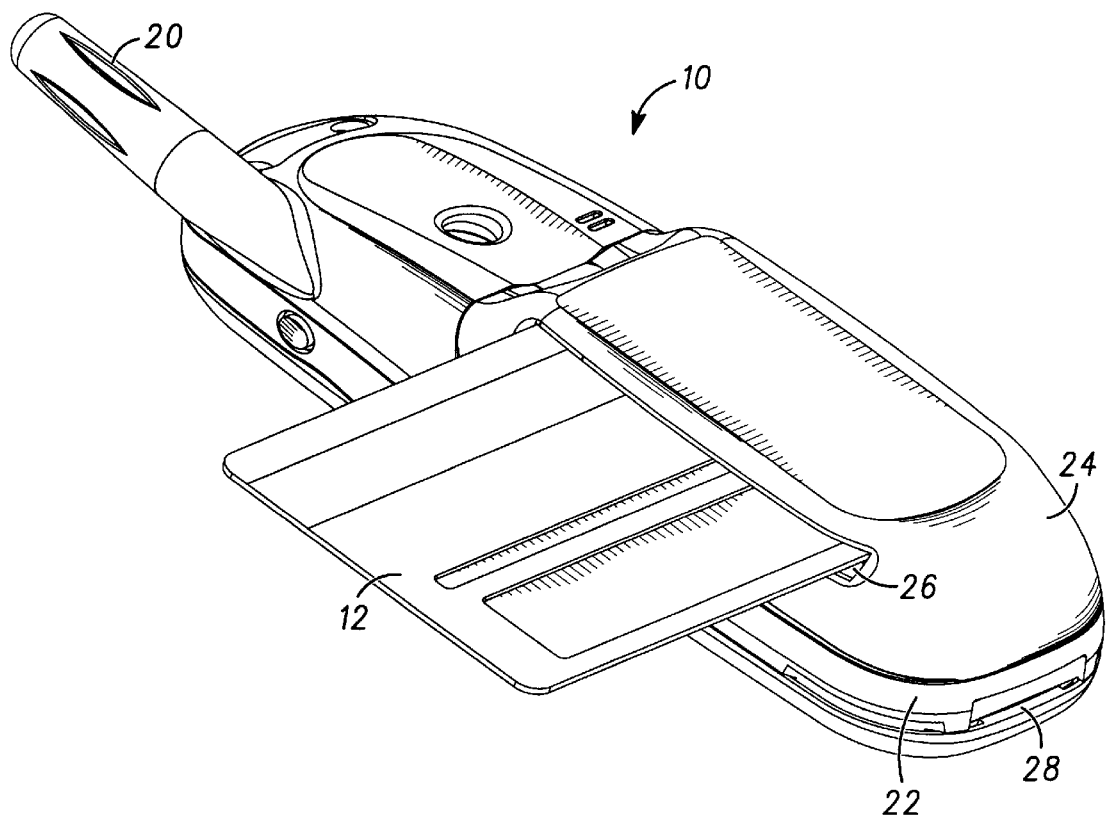
FIG. 2 is a rear perspective view of the electronic appliance of FIG. 1.

FIG. 2 is a rear perspective view of the electronic appliance 10 housing a housing 22 and a removable battery cover 24 that includes a card slot 26 and a suitable card reading circuit. The electronic appliance 10 also includes a base plug 28 located at a base of the housing 22.

Figure 3:
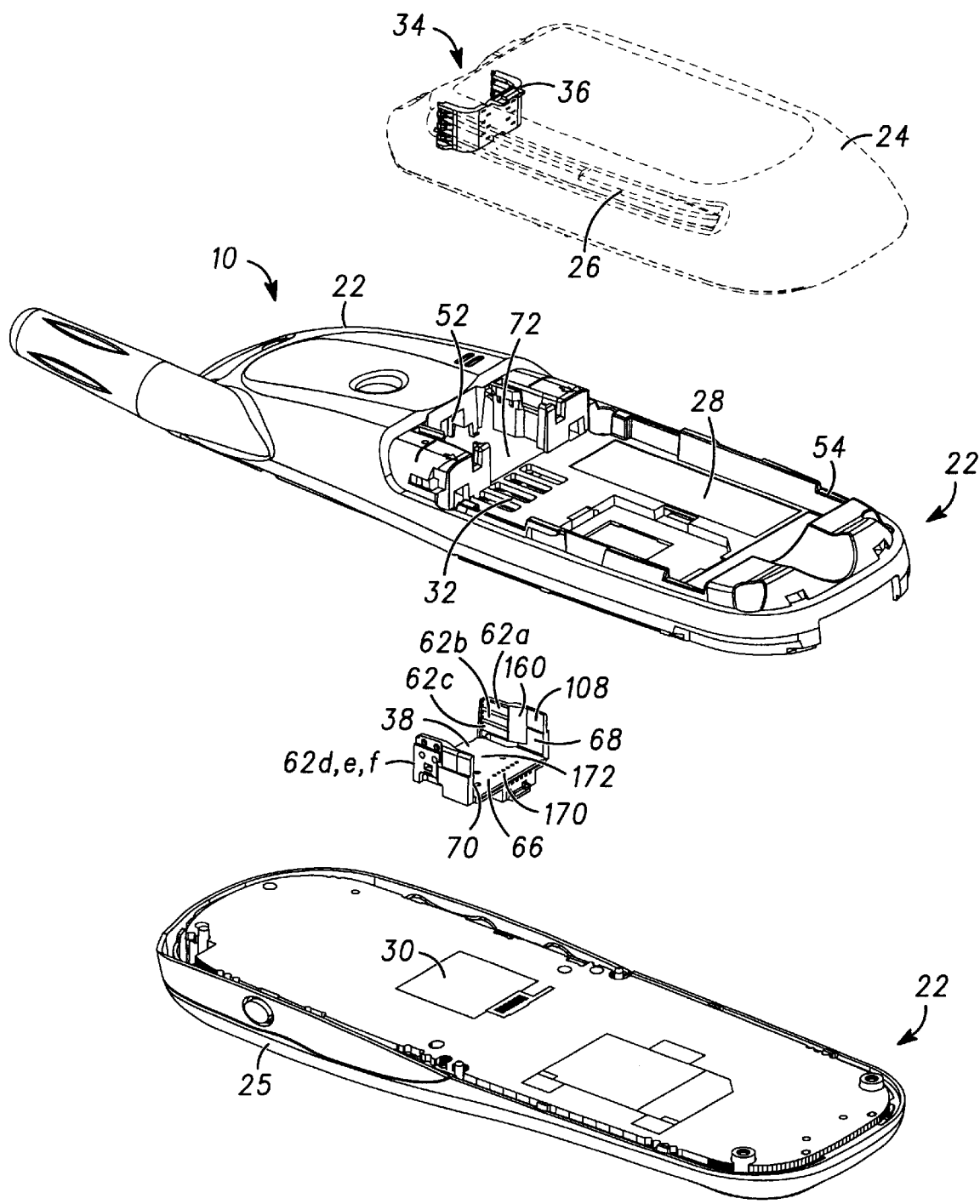
FIG. 3 is an exploded view of one embodiment of an electronic appliance in accordance with one embodiment of the invention.

FIG. 3 illustrates an exploded view of the electronic appliance 10 wherein the housing 22 includes a front housing 25 and the rear housing 26. However, it will be recognized that a single housing may also be desirable. The housing 22 includes a battery storage area 28 located in the rear housing 26. The housing 22 also includes a first electrical circuit 30 such as telephone related circuitry or other suitable electronic circuit or circuits that receive power from the battery stored in the battery storage area 28. As used herein, "electrical circuit" can include, but is not limited to, any optical or electrical component(s), circuit(s), interface, electrical contacts, electrical systems and subsystems including, but not limited to, electrical/mechanical subsystems, systems or any suitable connectable entity. In this example, the first electrical circuit 30 receives power from a battery in battery storage area 28 through protruding contacts (not shown) that pass through contact openings 32 as known in the art, from the front housing 25 into the rear housing 26. Corresponding contacts on an outer surface of the battery (not shown), as known in the art, make suitable contact with the protruding contacts when the battery is inserted into the battery storage area 28.

Figure 4:
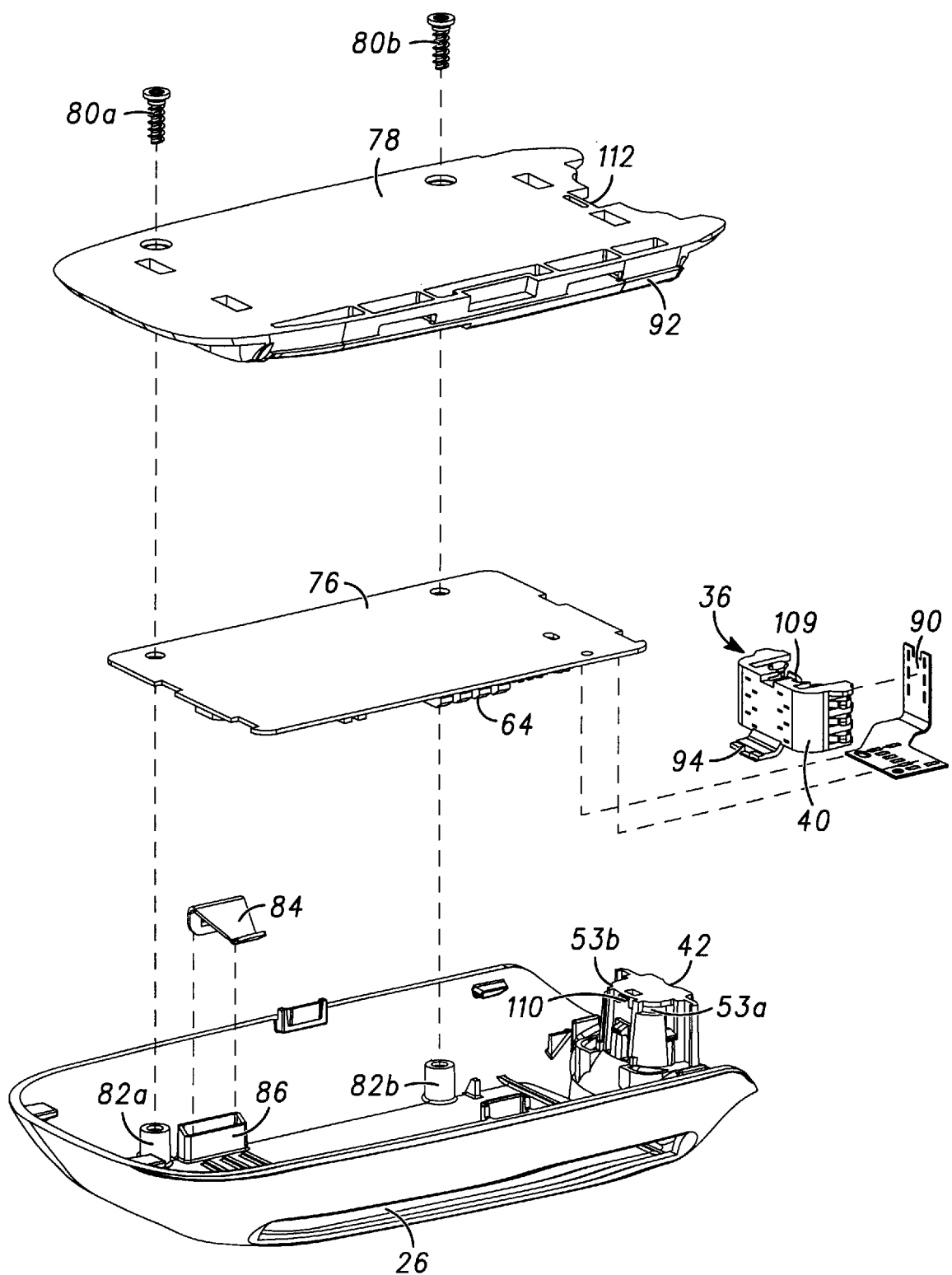
FIG. 4 is an exploded view depicting one example of a removable battery cover in accordance with one embodiment of the invention.
Figure 5:
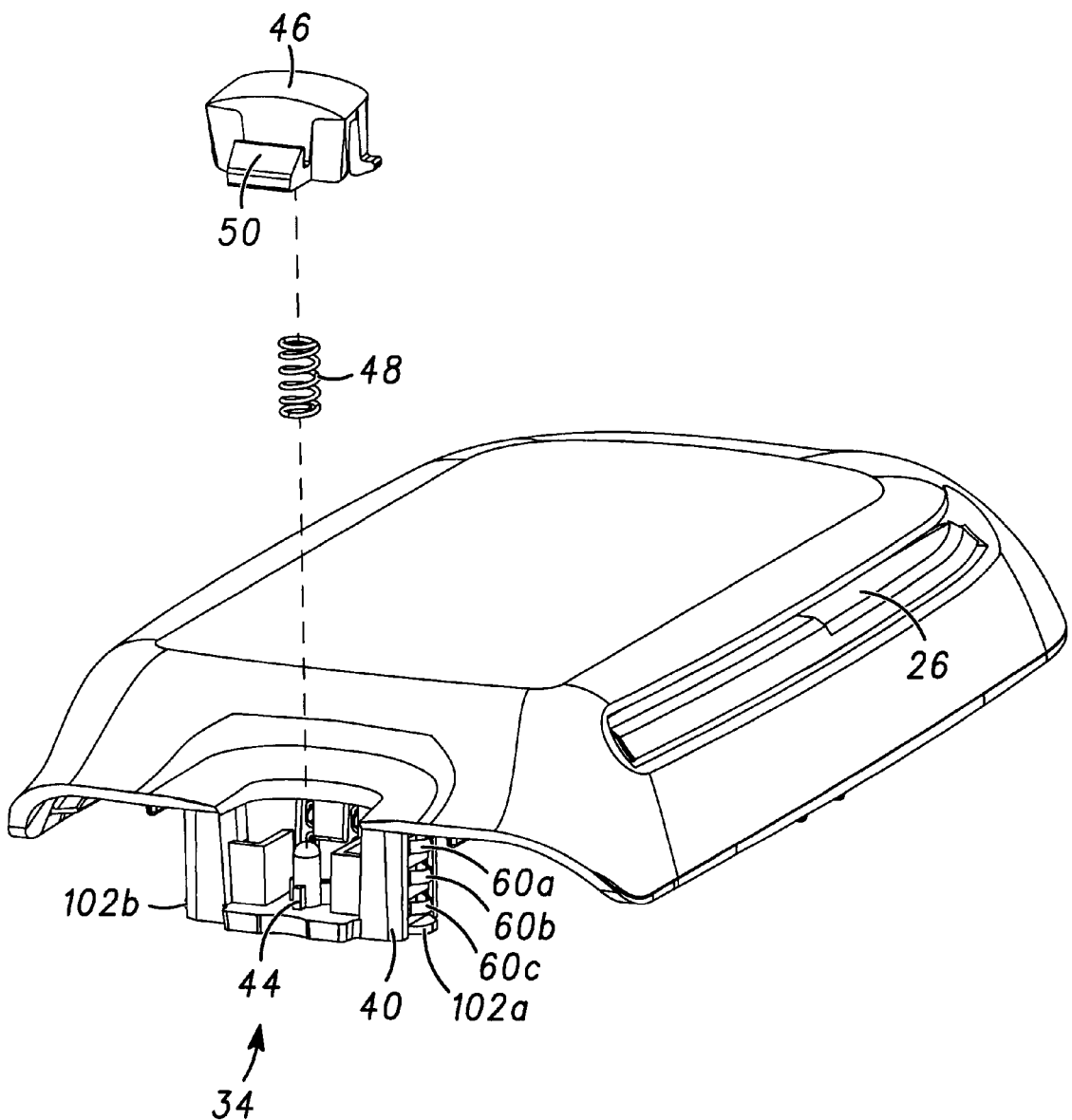
FIG. 5 is a top perspective view depicting one example of a removable battery cover and an exploded view of a latch in accordance with one embodiment of the invention.

Referring to FIGS. 3, 4 and 5, an electronic appliance with an electrical connector assembly will be described. The removable battery cover 24 includes a latch 34 engaged with a stacked connector 36. As used herein, "latch" can include a structure having only a portion of an interconnecting latch arrangement, or it can include a complete latching arrangement. The stacked connector 36 is engageable with a connector receptor well 38. In this embodiment, the connector receptacle well 38 may snap fit into the housing 22, for example, into the rear housing 26. The stacked connector 36 includes a molded connector contact housing 40 that is adapted to at least partially surround at least a portion of the latch 34. In this example, the connector contact housing 40 is in a "U" shape. However, it will be recognized that any suitable orientation or shape may be used.

The latch 34 may be formed by a latch well 42 that may be integrally molded as part of the removable battery cover 24. The latch well 42 accepts travel of a latch member, such as member 50 of the button. However, it will be recognized that the latch well 42 may also be a separate piece if desired. The latch well 42 includes a molded spring guide post 44, a locking release surface 46, such as a latch button, and a biasing member, such as a spring 48. The locking release surface 46 in this embodiment includes a protruding locking member 50 which lockingly engages a corresponding lip 52 in the housing 22, namely, in the rear housing 26. The latch button, spring 48 and spring guide post 44 may be of a conventional battery cover latch design. When the removable battery cover 24 is suitably slid over the battery, the latch 34 latches with the rear housing 26 so that the removable battery cover 24 does not fall off. The spring 48 biases the locking member 50 in an upward position with respect to the front housing 25 to force the locking member 50 to engage with the lip 52. To remove the removable battery cover 24, the locking release surface is depressed, thus depressing the spring to allow the lip 52 and the locking member 50 to disengage.

The latch well 42 has an outer surface that is operatively engageable with an inner surface of the connector contact housing 40. A pair of guide slots 53a and 53b are located on either side of the latch well to receive guide ribs 55a and 55b (see FIG. 6). In this embodiment, the latch well 42 and connector contact housing 40 are matingly engageable in a snap fit fashion to provide a combined latch and stacked connector assembly. The connector contact housing 40 includes a plurality of stacked contacts 60a–60f. The plurality of stacked contacts 60a–60f provide an electrical connection between the removable battery cover 24 and the electrical circuit 30 housed in the housing 22.

Referring to FIG. 3, the receptacle well 38 includes a plurality of corresponding stacked receptacle contacts 62a–62f. The plurality of corresponding stacked receptacle contacts 62a–62f are positioned to engage (e.g., resiliently contact) with the plurality of stacked contacts 60a–60f to provide electrical connection between the first circuit 30 in the housing 22 and a second circuit 64 located in the removable battery cover 24. As shown, the connector contact housing 40 and the receptacle well 38 are three dimensional connector components.

The receptacle well 38 is defined by a base 66, a first sidewall 68 and a second sidewall 70. The first sidewall 68 includes a portion of the plurality of stacked receptacle contacts, namely receptacle contacts 62a–62c whereas the second sidewall 70 includes stacked receptacle contacts 62d–62f. The receptacle well 38 is designed to snap fit into opening 72 to provide a receptacle for the stacked connector 36.

Referring to FIG. 4, the removable battery cover 24 includes the integral latch well 42 located on a distal end thereof. The removable battery cover 24 includes the electrical circuit 64 operatively connected inside the removable battery cover 24. The electrical circuit 64 may be positioned, for example, on a printed circuit board 76 which is supported by a printed circuit board support plate 78. The support plate 78 is secured to the removable battery cover 24 through screws 80a and 80b which are screwed into respective bosses 82a and 82b. In this embodiment, where the removable battery cover 24 includes a card reader, a card retaining spring 84 is suitably positioned with respect to the card slot 26 and is supported by a spring receptacle 86 such that when a card is inserted in slot 26, it is forcibly retained to come in contact with a smart card reading circuit on the printed circuit board 76. The printed circuit board support plate 78 includes the card support walls 92 along a periphery thereof to ensure that the card is a predetermined height above the circuit 64. A flexible circuit 90 serves as an interface between stacked contacts 60a–60f and conductors from circuit 64 to provide electrical continuity between the circuit 64 and the stacked contacts 60a–60f.

The stacked connector 36 includes a connector tab 94 protruding from a top surface to engage with a corresponding receptacle 112 in an end surface of support plate 78 in the removable battery cover 24. The stacked connector 36 is coupled to the latch 34, for example through protruding compliant portion 104 and aperture 110 or other suitable attachment arrangement, and is also coupled to the removable battery cover 24.

Figure 6:
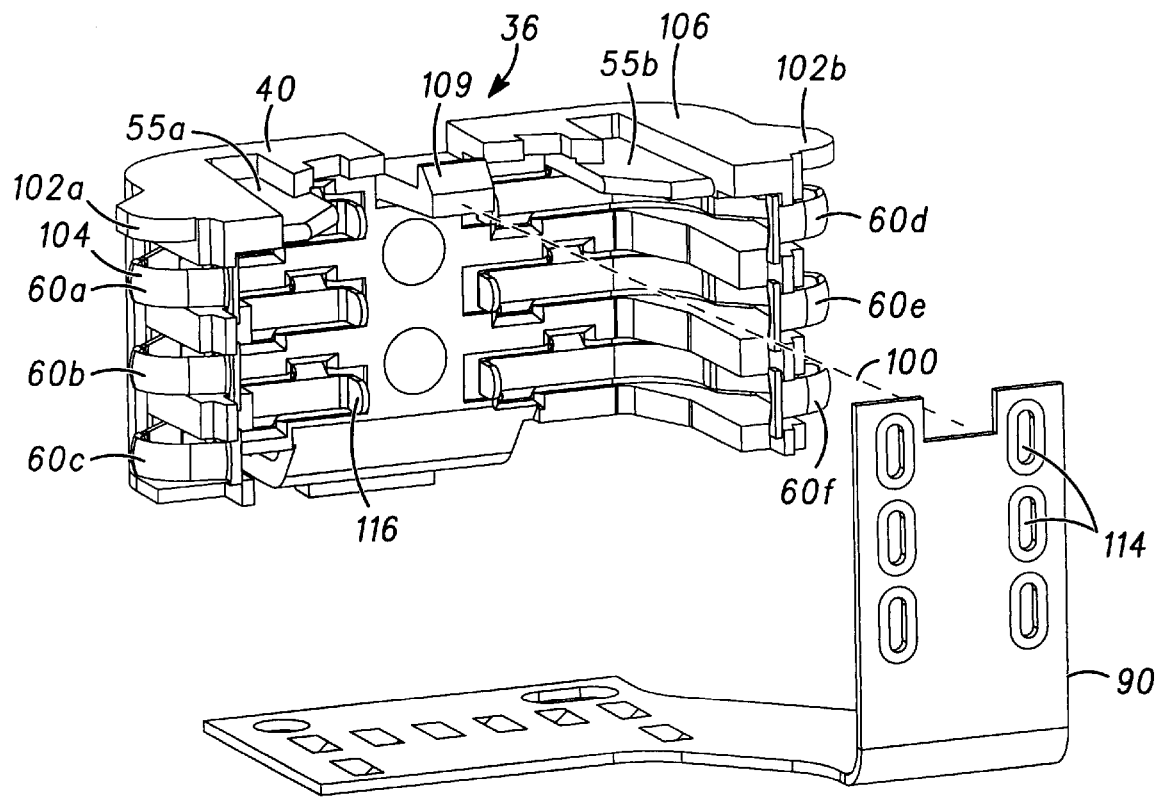
FIG. 6 is a front perspective view of the stacked connector shown in FIG. 5 in accordance with one embodiment of the invention.

FIG. 6 is a perspective view of a connector contact housing 40. The plurality of stacked contacts 60a–60f are positioned in a manner to provide balanced contact loading along an axis of the stacked connector 36. In this example, the plurality of stacked contacts 60a–60f are positioned to provide balance along the direction of the longitudinal axis 100. For example, stacked contact 60a is opposingly positioned with respect to stacked contact 60d. The stacked contacts 60a, 60b and 60c are symmetrically located about the longitudinal axis 100 with respect to stacked contacts 60d, 60e and 60f. The stacked contacts 60a–60c are positioned (i.e., stacked) in a vertical direction with respect to a horizontal plane formed by the base 106. The stacked contacts 60a–60c are positioned on an outer surface of the connector contact housing. Similarly, the stacked contacts 60d–60f are also positioned (i.e., stacked) in a vertical direction in the same horizontal planes as stacked contacts 60a–60c. The stacked contacts 60d–60f are also positioned on an outer surface of the connector contact housing.

The connector contact housing 40 includes a pair of integrally formed contact protection tabs 102a and 102b. These contact protection tabs 102a and 102b are positioned underneath each set of stacked contacts and are in vertical alignment therewith to protect against contact damage when the latch 34 and stacked connector 36 are inserted into the receptacle well 38. The contact protection tabs 102a and 102b have a generally curved shape corresponding to a protruding compliant portion 104 of the stacked contacts 60a–60f. The contact protection tabs 102a and 102b project outwardly from the connector contact housing 40. The plurality of stacked contacts 60a–60f are compliant by virtue of the protruding compliant portion 104. Accordingly, portions of the stacked contacts 60a–60f resiliently project from the connector contact housing 40 outwardly to engage (e.g., resiliently contact) the receptacle contacts 62a–62f.

Alternatively, the stacked contacts 60a–60f may be noncompliant. In such an embodiment, the receptacle contacts 62a–62f would protrude inwardly to frictionally engage the non-compliant stacked contacts. Accordingly, it may be desirable to provide the compliant contacts in the receptacle well instead of on the stacked connector.

The contact protection tabs 102a and 102b are located on a base 106 of the connector contact housing 40 and serve both as an insert guide into the receptacle well 38 in a front portion 108 thereof (FIG. 3) and to protect the stacked contacts 60a and 60d from being inadvertently damaged upon downward axial insertion into the receptacle well 38. For example, the contact protection tabs 102a and 102b prevent sidewalls 66 and 68 from initially contacting the stacked contacts when the removable battery cover 24 is inserted downwardly into the receptacle well 38. The contact protection tabs 102a and 102b also serve as keying tabs so that the removable battery cover 24 cannot be inserted into older appliances. However, older battery covers can be used to cover the battery in the electronic appliance 10 since the latch area of the older covers is of the same design and area allowed by the receptacle well.

The connector contact housing 40 also includes an attachment member, such as latch tab 109, adjacent to the base 106 that lockingly engages with an aperture 110 (see FIG. 4) in a base of the latch well 42. The connector tab 94 lockingly engages with a surface in the removable battery cover. In this example, the connector tab 94 engages with a protruding surface in slot 112 of the PCB support plate 78. The connector contact housing 40 accordingly includes an attachment member, such as latch tab 109 or other suitable attachment mechanism, which is connectable with the latch 36 through, for example, the base of the latch well, and also includes a second attachment member, such as connector tab 94, which is connectable with a housing. However, it will be recognized that the connector contact housing 40 may be suitably attached to the removable battery cover in any suitable location, orientation or manner.

Figure 7:
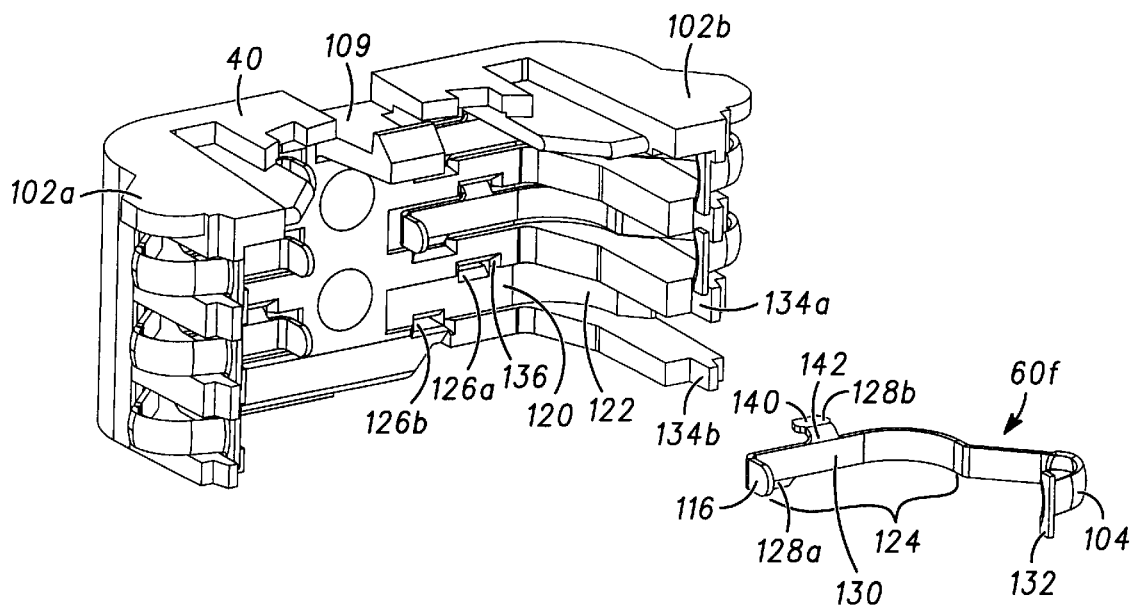
FIG. 7 is a front perspective view of the stacked connector shown in FIG. 6 illustrating one example of a stacked contact in accordance with one embodiment of the invention.

Referring to FIGS. 6 and 7, the flexible circuit 90 includes a plurality of apertures 114 that receive projecting ends 116 on each of the stacked contacts 60a–60f to suitably align the flexible circuit 90 in place. The apertures 114 are plated and are soldered to the projecting ends 116. The connector contact housing 40 includes a contact alignment groove 120 for each of the plurality of stacked contacts 60a–60f. Each contact alignment groove 120 includes an alignment groove surface 122 which aligns a respective stacked contact 60a–60f. The alignment groove surface 122 is suitably shaped to accommodate a non-compliant portion 124 of each stacked contact.

The connector contact housing 40 also includes a plurality of contact alignment slots 126a and 126b associated with each stacked contact 60a–60f. The contact alignment slots 126a and 126b receive contact attachment tabs 128a and 128b, respectively. The contact attachment tabs 128a and 128b are formed to project perpendicularly from a stem surface 130 of each contact. Each stacked contact 60a–60f includes a non-compliant portion 124 and compliant portion 104. In this embodiment, the compliant portion 104 is a curved distal portion of a contact. A contact retaining surface 132 located at an end of the compliant portion 104 is placed against a pair of retaining surfaces 134a and 134b in the connector contact housing 40 such that the compliant portion 104 is retained in place when no external force is present. The contact alignment groove surface 122 is interposed between the retaining surfaces 134a and 134b.

Each stacked contact 60a–60f is retained in the connector contact housing 40 through the attachment tabs 128a and 128b. Each of the attachment tabs 128a and 128b are pressed into the alignment slots 126a and 126b. The alignment slots 126a and 126b are defined by slot walls having slanted surfaces 136 which are slanted inwardly so that the attachment tabs 128a and 128b are easily guided into the slots. The attachment tabs 128a and 128b are engageable with a surface in the connector contact housing, namely walls defining the slots 126a–126b. The width of alignment slots 126a and 126b is suitably dimensioned to be slightly smaller than a width of a head 140 of the attachment tab 128 a and 128b. In this way, the plastic connector contact housing 40 will allow insertion of the attachment tabs 128a and 128b into the alignment slots 126a and 126b but the head being larger, prevents the contact from falling out of the alignment groove 120. Accordingly, each of the stacked contacts has a curved compliant portion 104 and at least one attachment tab 128a or 128b. It will be recognized that any suitable connection technique or mechanism may also be used. Each stacked contact 60a–60f may be formed of a suitable conductive material, such as metal, plated metal, plated plastic or any other suitable electrically conductive material.

Figure 8:
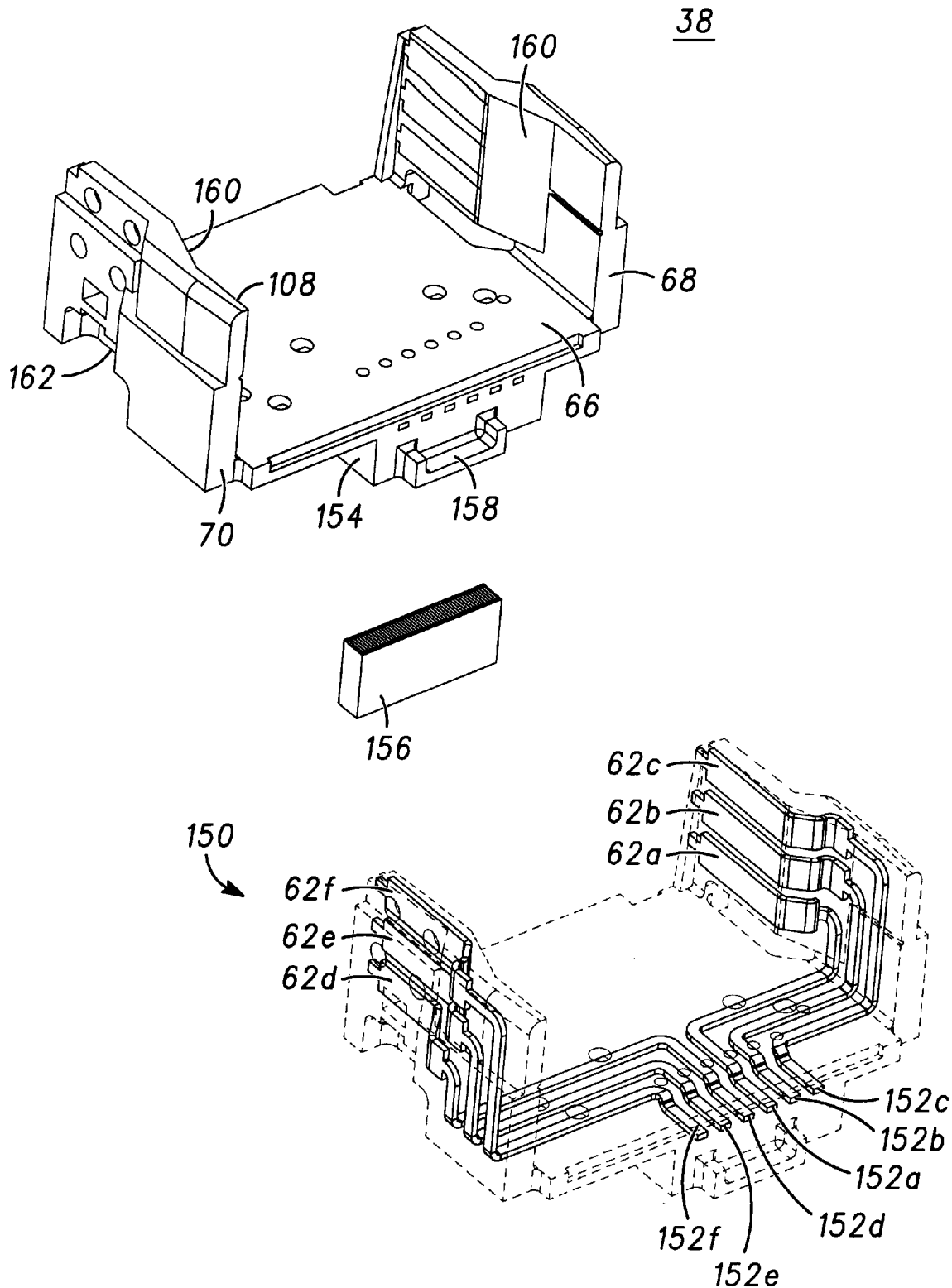
FIG. 8 illustrates one example of a connector receptacle well in accordance with one embodiment of the invention.

FIG. 8 illustrates one embodiment of the receptacle well 38. The receptacle well 38 is preferably made by molding the plastic portion of the receptacle well 38 around a metal lead frame 150. The metal lead frame 150 includes the stacked receptacle contacts 62a–62f. The receptacle contacts 62a–62f are located at one end of the lead frame 150, and interconnect surfaces 152a–152f are located at another end. The interconnect surfaces 152a–152f are used to interconnect with a printed circuit board in the parent device, or provide other electrical connection that is desired. Receptacle contact 62d is shorter than other receptacle contacts 62a–62c and 62b and 62f so that it is the last contact to mate with the electrical connector assembly. This contact is usually used to provide power to the accessory device. In this way, a last to mate, first to break connection is provided so that signal lines are properly connected prior to power being connected or disconnected.

The connector receptacle well 38 not only receives the stacked connector 36, but also includes an extension 154 adapted to receive a flexible connector 156 to position the flexible connector to complete a connection with contacts on a PCB in the housing. The extension 154 includes the interconnect surfaces 152a–152f. The extension 154 receives the flexible connector 156, such as an elastomeric membrane, or any other suitable electrical connector. The flexible connector 156 is pressed in contact with connections on the printed circuit board in the parent device so that electrical connection between the accessory device through the stacked connector is made with the printed circuit board in the parent device. However, it will be recognized that any suitable connector may also be used such as flex strips, or any suitable connectors. The extension 154 is integrally molded as part of the receptacle well 38. The extension 154 includes a mounting surface 158 which is used to mechanically engage with a corresponding mounting surface in the housing 22 to hold the receptacle well in a fixed position.

The receptacle well 38 includes an inclined surface 160 on each of sidewalls 68 and 70. Each of the inclined surfaces 160 serves as a transition surface for the compliant portion 104 of the contacts 60a–60f as the stacked connector 36 and latch 34 are being inserted into the receptacle well 38. The receptacle well 38 also includes lower guide slots 162 into which the protection tabs 102a and 102b are guided when the stacked connector is slid forward to provide contact with the receptacle contacts.

To place the removable battery cover 24 onto the housing 22, the protection tabs 102a and 102b are positioned to align in a rear end 170 (see FIG. 3) of the receptacle housing. The electrical connector assembly in the removable battery cover is then pushed downward so that the removable battery cover 24 rests on guide services 54. The electrical connector assembly and removable battery cover is then slid in a forward longitudinal direction toward the forward end 172 of the receptacle well 38. As the electrical connector assembly is moved forward, the compliant stacked contacts slide along inclined surfaces 160 and contact with receptacle contacts 62a–62f. The protruding locking member 50 latches with lip 52 to lock the cover and electrical contacts in place.

To remove the removable battery cover, the latch button is depressed and the cover is slid backwards towards the end of the housing 22. The electrical connector assembly will then abut the battery in the battery storage area. The removable battery cover may then be lifted upwardly away from the housing.

The disclosed compact combined latch and electrical connector is sized to occupy the same space as a conventional latch so as to allow the use of older style battery covers on newer electronic appliances that can interface with accessories. The load balanced stacked contacts can reduce contact bounce problems and are suitably protected upon insertion. In addition, the removable battery cover does not need to include a battery thereby reducing the cost of the accessory. Other advantages will be apparent to those of ordinary skill in the art.

It should be understood that the implementation of other variations and modifications of the invention in its various aspects will be apparent to those of ordinary skill in the art, and that the invention is not limited by the specific embodiments described. For example latching members may include projections and corresponding detents, sliding lateral latching projections or interconnections, or any other suitable mechanisms. The latch may include a relieved piece of plastic or other material extending from the cover which obtains its bias by nature of the compliancy of the plastic. In this embodiment, the latch need not include a button and spring arrangement. Other latch arrangements may also be used. It is therefore contemplated to cover by the present invention, any and all modifications, variations, or equivalents that fall within the spirit and scope of the basic underlying principles disclosed and claimed herein.

What is claimed is:

1. A removable battery cover for a device comprising:
    a latch; and
    a stacked connector having a connector contact housing adapted to at least partially surround at least a portion of the latch, and wherein the connector contact housing has a plurality of stacked contacts to provide an electrical connection between the removable battery cover and an electrical circuit housed in a separate housing of the device.

2. The removable battery cover of claim 1 wherein the plurality of stacked contacts are positioned in a manner to provide balanced contact loading along at least one axis of the stacked connector.

3. The removable battery cover of claim 1 wherein the latch comprises a locking member, a locking release surface and a biasing member.

4. The removable battery cover of claim 1 wherein the latch comprises a latch well operatively engageable with the connector contact housing.

5. The removable battery cover of claim 1 comprising an electrical circuit operatively connected inside the removable battery cover.

6. The removable battery cover of claim 5 comprising a printed circuit board (PCB) support plate and wherein the electrical circuit is located on a printed circuit board that is supported by the PCB support plate.

7. The removable battery cover of claim 5 wherein the electrical circuit comprises a card reader.

8. The removable battery cover of claim 1 wherein the connector contact housing comprises at least a first contact protection tab and a second contact protection tab.

9. The removable battery cover of claim 2 wherein the plurality of stacked contacts comprise:
    at least a first set of stacked contacts wherein each contact is positioned in a vertical direction with respect to a horizontal plane defined by a base of the connector contact housing, on an outer surface of the connector contact housing;
    at least a second set of stacked contacts wherein each contact is positioned in a vertical direction with respect to the horizontal plane defined by the base, on an outer surface of the connector contact housing; and
    wherein the first and second set of stacked contacts are symmetrically located about a longitudinal axis of the connector contact housing.

10. The removable battery cover of claim 2 wherein the plurality of stacked contacts are compliant.

11. The removable battery cover of claim 2 wherein the plurality of stacked contacts are non-compliant.

12. The removable battery cover of claim 2 wherein each of the plurality of stacked contacts have a curved compliant portion and an attachment tab that is engageable with a surface in the connector contact housing.

13. A removable battery cover for a device comprising:
    a combined latch and connector arrangement that comprises:
        a latch having a three dimensional latch well protruding from a surface of the removable battery cover and operative to latch the removable battery cover to a separate housing of the device; and
        a stacked connector, operatively engageable with the latch wherein the stacked connector has a three dimensional connector contact housing adapted to at least partially surround at least a portion of the latch, and wherein the connector contact housing has a plurality of stacked contacts to provide an electrical connection between the removable battery cover and an electrical circuit housed in the separate housing of the device, and wherein the plurality of stacked contacts are positioned in a manner to provide balanced contact loading along at least one axis of the stacked connector.

14. The removable battery cover of claim 13 wherein the latch comprises a locking member, a locking release surface and a biasing member.

15. The removable battery cover of claim 13 having an electrical circuit operatively connected inside the removable battery cover.

16. The removable battery cover of claim 15 having a printed circuit board (PCB) support plate and wherein the electrical circuit is located on a printed circuit board that is supported by the PCB support plate.

17. The removable battery cover of claim 15 wherein the electrical circuit has a card reader and wherein the removable battery cover has a card slot to receive a card read by the card reader.

18. The removable battery cover of claim 13 wherein the connector contact housing has at least a first contact protection tab and a second contact protection tab.

19. The removable battery cover of claim 13 wherein the plurality of stacked contacts comprise:
   at least a first set of stacked contacts wherein each contact is positioned in a vertical direction with respect to a horizontal plane defined by a base of the connector contact housing, on an outer surface of the connector contact housing;
   at least a second set of stacked contacts wherein each contact is positioned in a vertical direction with respect to the horizontal plane defined by the base, on an outer surface of the connector contact housing; and
   wherein the first and second set of stacked contacts are symmetrically located about a longitudinal axis of the connector contact housing.

20. The removable battery cover of claim 13 wherein the plurality of stacked contacts are compliant.

21. The removable battery cover of claim 13 wherein the plurality of stacked contacts are non-compliant.

22. The removable battery cover of claim 13 wherein each of the plurality of stacked contacts has a curved compliant portion and an attachment tab that is engageable with a surface in the connector contact housing.

23. An electrical connector assembly comprising:
   a latch;
   a stacked connector having a connector contact housing adapted to at least partially surround at least a portion of the latch, and wherein the connector contact housing has a plurality of stacked contacts to provide an electrical connection between a first electrical circuit and a second electrical circuit; and
      a receptacle well having a plurality of corresponding stacked receptacle contacts operative to engage the plurality of stacked contacts to provide electrical connection between the first and second electrical circuits.

24. The electrical connector of claim 23 wherein the receptacle well is defined by at least a base, a first sidewall having a first plurality of the stacked receptacle contacts thereon and a second sidewall having a second plurality of stacked receptacle contacts thereon.

25. The electrical connector of claim 23 wherein the connector contact housing comprises a first attachment member connectable with the latch, and a second attachment member.

26. The electrical connector of claim 23 wherein the connector contact housing comprises at least a first contact protection tab and a second contact protection tab.

27. The electrical connector of claim 23 wherein the plurality of stacked contacts comprise:
   at least a first set of stacked contacts wherein each contact is positioned in a vertical direction with respect to a horizontal plane defined by a base of the connector contact housing, on an outer surface of the connector contact housing;
   at least a second set of stacked contacts wherein each contact is positioned in a vertical direction with respect to the horizontal plane defined by the base, on an outer surface of the connector contact housing; and
   wherein the first and second set of stacked contacts are symmetrically located about a longitudinal axis of the connector contact housing.

28. The electrical connector of claim 23 wherein the plurality of stacked contacts are compliant.

29. The electrical connector of claim 23 wherein the plurality of stacked contacts are non-compliant.

30. The electrical connector of claim 23 wherein each of the plurality of stacked contacts have a curved compliant portion and an attachment tab that is engageable with a surface in the connector contact housing.

31. An electronic appliance comprising:
   a housing with a battery storage area, a connector receptacle well and a first electrical circuit operative to receive energy from a battery stored in the battery storage area; and
   a removable battery cover that comprises,
   a latch; and
   a stacked connector, engageable with the connector receptacle well, wherein the stacked connector has a connector contact housing adapted to at least partially surround at least a portion of the latch, and wherein the connector contact housing has a plurality of stacked contacts to provide an electrical connection between the removable battery cover and the electrical circuit housed in the housing.

32. The electronic appliance of claim 31 wherein the plurality of stacked contacts are positioned in a manner to provide balanced contact loading along at least one axis of the stacked connector.

33. The electronic appliance of claim 31 wherein the latch comprises a locking member, a locking release surface and a biasing member.

34. The electronic appliance of claim 31 wherein the latch comprises a latch well operatively engageable with the connector contact housing.

35. The electronic appliance of claim 31 comprising a second electrical circuit operatively connected inside the removable battery cover and coupled to receive power from the first electrical circuit after the first circuit is coupled to the battery through the stacked connector.

36. The electronic appliance of claim 35 having a printed circuit board (PCB) support plate and wherein the second electrical circuit is located on a printed circuit board that is supported by the PCB support plate.

37. The electronic appliance of claim 35 wherein the second electrical circuit has a card reader.

38. The electronic appliance of claim 31 wherein the connector contact housing has at least a first contact protection tab and a second contact protection tab.

39. The removable battery cover of claim 31 wherein the plurality of stacked contacts comprise:
   at least a first set of stacked contacts wherein each contact is positioned in a vertical direction with respect to a longitudinal axis of the removable battery cover, on an outer surface of the connector contact housing;
   at least a second set of stacked contacts wherein each contact is positioned in a vertical direction with respect to a longitudinal axis of the removable battery cover, on an outer surface of the connector contact housing; and
   wherein the first and second set of stacked contacts are symmetrically located about the longitudinal axis.

40. The electronic appliance of claim 31 wherein the plurality of stacked contacts are compliant.

41. The electronic appliance of claim 31 wherein the plurality of stacked contacts are non-compliant.

42. The electronic appliance of claim 31 wherein each of the plurality of stacked contacts have a curved compliant portion and an attachment tab that is engageable with a surface in the connector contact housing.

43. The electronic appliance of claim 31 wherein the electronic appliance is a telephone appliance and wherein the housing has a telephone input interface.

44. The electronic appliance of claim 31 wherein the connector receptacle well has an extension adapted to receive a flexible connector extension to position the flexible connector to complete a connection with contacts on a PCB in the housing.

* * * * *